Patented May 3, 1932

1,856,596

UNITED STATES PATENT OFFICE

GEORGE H. STEVENS, OF NEWARK, NEW JERSEY

VULCANIZING RUBBER

No Drawing.    Application filed September 30, 1925. Serial No. 59,726.

This invention relates to improvements in the use of organic nitrogenous substances that assist in or accelerate the vulcanization of rubber, and has for its object the utilization of new products that are mentioned for this purpose.

This specification is a continuation in part of Ser. No. 647,765 filed June 25, 1923, that issued in part as Patents 1,559,196; 1,559,197; and 1,559,198.

The use of organic nitrogenous compounds in the vulcanization of rubber is quite general and the products so used are technically termed "accelerators".

Whether such bodies act as catalysts, sulphur carriers, polymerizers, activators, or accelerators, is not the purpose of this specification to discuss, but I make use of the conventional term "accelerator" in my mention of them.

In experimental work with various nitrogenous organic compounds that I have used, to assist in the vulcanization of rubber, I have found that certain derivatives of carbo-diimides form exceedingly valuable products for this purpose, and contrary to the general impression that they are not suitable for this use in rubber vulcanization.

Di-tolyl guanidine may be derived from either carbomono- or carbodi-tolylimide. Commonly it is produced by uniting carbodi-tolylimide with ammonia. It also forms upon combining carbomono-tolylimide with aniline.

Tetra-phenyl melamine is a phenylated carbo-diimide and represents the normal disassociation end product, as well as the inevitable accompanying product, of commercial diphenyl guanidine (Weith, Ber. 1875, 8, 912–917) and I have also found that other derivatives of carbo-diimides are also very efficient aids to vulcanization, and especially where they are markedly basic in character.

An example of such a product is tetra-tolyl melamine, (tetra-tolyl tricarbodiimide) expressed by the following formula:

$$C_{31}H_{30}N_6 \text{ or } C_3H_2(C_7H_7)_4N_6$$

This body represents the normal disassociation end product, as well as the inevitable accompanying product, of commercial di-tolyl guanidine.

Tetra-tolyl melamine has a nitrogen content of over 17% and is comparatively stable during the period, and at the usual temperatures of vulcanization.

The product can be produced in various ways, but one manner is to unite two molecules of carbotolylimide $(C_8H_8N_2)$, with one molecule of carbodi-tolylimide.

$$C_7H_7N:C:NC_7H_7$$

producing one molecule of tetra-tolyl tricarbodiimide.

The same molecular percentages of the polymeric forms respectively, of these same carbo-tolylimides, also produce tetra-tolyl tricarbodiimide, by polymerizing them together.

This identifies the product then as a derivative of carbo-diimide.

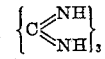

A similar product results from the corresponding union of two molecules of carboxylilimide $(C_9H_{10}N_2)$, with one molecule of carbodi-xylilimide, $$C_8H_9N:C:NC_8H_9$$

which then would be tetra-xylil tricarbodiimide.

$$C_{35}H_{38}N_6 \text{ or } C_3H_2(C_8H_9)_4N_6$$

This body also proves a good accelerator but with a somewhat lower nitrogen content.

These respective mono- and di-substituted carbodiimides, as for example mono- and di-tolyl substituted carbodiimide, are used in a combination that polymerizes them together.

One method of obtaining carbo- (mono- or di-substituted) -imides, is by desulphurizing the corresponding substituted thiourea. Such desulphurizing is however subject to many modifications, depending on the presence of other products, and so mixed products may result.

For instance, -mustard oil is frequently present in di-substituted thiourea. If desulphurization of di-substituted thiourea takes place then in the presence of ammonia and -mustard oil, a formation of the corresponding mono-substituted thiourea could take place, and a desulphurization of both thioureas then would yield the two corresponding carbo-substituted-imides.

These carbo-substituted-imides then might be combined to tetra-substituted tricarbodiimide, even though intermediate products form first, during such combination, but the carbo-di-substituted-imide remaining with the ammonia would combine to produce di-substituted guanidine, and if such substitution was the phenyl group, it would be diphenyl guanidine, that is, di-substituted thiourea containing phenyl mustard oil, upon being desulphurized in the presence of ammonia, would produce a combination of diphenyl guanidine and tara-phenyl melamine (Hofmann, Ber. 1869, II, 460).

The other tolyl and xylil di-substituted guanidines react in much the same manner.

Under a general heat decomposition of diphenylguanidine carbomonophenylimide splits off first, then carbodiphenylimide splits off, and two molecules of the former with one of the latter make tetraphenylmelamine (Weith, Ber. 1875, 8, 912–917), (Rathke, Ber. 1887, 20, I, 1065–1074).

Practically the same reactions and results are found with the tolyl and xylil corresponding bodies respectively.

There are also several other methods under which these products may be formed.

Some derivatives of di-substituted carbodiimides, such for example as the di-substituted guanidines then, are mediums through which both mono- and di-substituted carbodiimides may be made to appear, where only the di-substituted product was utilized to start with, and a combination then of either of the resultant disassociation mono- and di-substituted carbodiimides may take place with the product from which they cam (the guanidine), or they may combine in several different ways with each other, or they may again still further combine with some of the combination products that they have formed, and produce from many of these numerous and different reactions the same unusual product of tetra-substituted tricarbodiimide, commonly called tetra-substituted melamine.

Under desulphurization, whether mono- and di-substituted carbodiimide in the beginning, combine and short cut to tetra-substituted tricarbodiimide, or whether the di-substituted carbodiimide be converted first to a di-substituted guanidine and the under disassociation reappear as mono-substituted carbodiimide, or whether one or both combine then with a guanidine, or whether they combine with each other in different molecular proportions, or whether either one or both later combine with these same addition products, the normal end-product of most of these reactions when carried to conclusion is tetra-substitutedtricarbodiimide.

Upon careful observation and study of these numerous reactions, occurring in the formation of many of the derivatives of carbodisubstituted-imides as for example carboditolylimide can be based a more logical theory of accelerated vulcanization than has so far been advanced, and it appears then that the value of an accelerator depends largely on, and its effect is largely proportional to, the sum total of the amount of ionic energy developed, and the amount of reformation energy developed, in these combined reactions.

The first may be included in the term basicity, but the second has largely been lost sight of, and so a more comprehensive term for both might be the, "energy developed through chemical activity", and so the value of an accelerator would appear to be largely proportional to the amount of such energy as is utilizable in activating the sulphur in vulcanizing, and of the many products that may be so utilized, those that will develop this energy most gradual and within easiest control, should prove the best.

Nitrogenous compounds then seem to furnish more of such examples than are to be found in the other groups, and the inter-reactions of such nitrogenous bodies appear to be more readily controlled, and finally, the derivatives of the carbo- -diimides including the mono- and di-substitutions thereof, as for example the di-tolyl substitutions should furnish the best of these accelerators, because these derivatives will more frequently furnish the maximum amount of reaction energy through their unusual chemical activity when subjected to the temperatures of vulcanization.

Tetra-tolyl tricarbodiimide is a body that appears to be of such suitable character that it can be used even in a very impure state and still give excellent results. It is cryptocrystalline and so its isolation in a regular crystalline form is effected with some difficulty, but it is entirely unnecessary that it be prepared of this degree of purity for use, so it can be used, in its amorphous or gummy state, or in any mixed isomeric form, or with its related by-products and impurities present, without materially diminishing its usefulness. These bodies can then suitably lower its M. P.

Merely its degree of purity should be determined and then formulæ for its use would be based on such pure content.

This accelerator proves itself of unusual value in tire and tube compounds.

An example of a representative rubber compound and its cure, using tetra-tolyl tricarbodiimide as an accelerator would be:

*For high tensile black*

```
82   % smoked sheets.              Cure:
 5   % zinc oxide.     44 minutes at 40 lbs. steam pressure.
 7   % barytes.                      or:
 5½ % sulphur.         20 minutes at 40 lbs. steam pressure
 0½ % tetra-tolyl                 for best aging.
       tricarbodiimide.
```

An unusually high tensile results from the first of these cures.

*For friction stock*

```
82   % smoked sheets.              Cure:
 5   % sulphur.       35 minutes at 37 lbs. steam pressure.
 2   % magnesium oxide.
10½ % zinc oxide.
 0½ % tetra-tolyl tricarbodiimide.
```

*For red tube stock*

```
69½ % smoked sheets.
18   % golden or crimson antimony.
 5   % zinc oxide.
 7   % barytes.
 0½ % tetra-tolyl tricarbodiimide.
```

Many of the derivatives of carbo-diimides are cryptocrystalline compounds with the amorphous appearance more frequently in evidence than the crystalline form, and so they are not readily separated from their accompanying compounds, that may be present due to their origin, or present as by-products of their formation, such as carbo-mono- and carbodi-tolylimide, but which separately are also accelerators, just as they are accelerators in combination in tetratolyltricarbodiimide.

Carbodi-imide as well as the phenyl, tolyl, and xylil substitution products thereof may some of them assume the form of polymeric modifications, for example any polymeric form of carbodi-tolylimide may then be used as the accelerator, taking the place of an equal amount of the accelerator shown in the examples.

The use of the term cryptocrystalline in this specification is intended to designate a body that is at times amorphous, either in fact or in appearance, and yet at other times is of a definite crystalline form. Hidden crystals would be a concise definition.

These cryptocrystalline carbodi-imide derivatives seem to be generally of great stability at the temperatures required for vulcanization, have a fairly high nitrogen content, and appear not to be very reactive with their own by-products during use.

Another characteristic of them is, that frequently they are higher melting bodies, resulting from the decomposition of lower melting bodies, which in acceleration means, the original accelerator of lower melting point, as for example carbodi-tolylimide is progressively decomposed or changed under vulcanization into the higher melting polymerized carbodi-tolylimide accelerator, and in theory, eventually the lower melting accelerator becomes more or less exhausted and when the cure is completed, the higher melting accelerating material then present, inhibits the activity of further vulcanization in the cold, or as expressed in technical parlance, the resultant rubber product thus has, "better aging quality", or "stands aging better".

My invention then consists in utilizing, in rubber vulcanization, the bodies herein mentioned and which appear to have superior qualities to many of the compounding ingredients used heretofore in compounding and vulcanizing rubber.

While I have described my invention in detail, and stated the manner in which the products mentioned may be prepared and used, it is to be understood that I do not mean to be limited in this specification to the use of the particular ingredients mentioned as examples, or in any way, except by the claims as set forth and annexed herewith.

Having now described my invention and having shown in what manner the same may be utilized, what I claim as new, and desire to secure by Letters Patent is:

1. A process of vulcanizing rubber which consists in, incorporating a member of the class consisting of carbodi-tolylimide and its polymeric modifications into rubber as an aid in vulcanizing, then heating the resultant rubber mixture with a vulcanizing agent to effect vulcanization.

2. A process of vulcanizing rubber which consists in, incorporating a vulcanizing agent with compounded rubber, then under heat, causing a reaction within the rubber mixture between carboditolylimide, the vulcanizing agent, and the rubber while effecting vulcanization.

3. A process of vulcanizing rubber which consists in, incorporating a vulcanizing agent with compounded rubber, then under heat, causing a reaction within the rubber mixture between a di-substituted carbodiimide, the vulcanizing agent, and the rubber while effecting vulcanization, said di-substituted carbodiimide being homologous to carboditolylimide.

4. A vulcanized compound derived from rubber or similar material, a vulcanizing agent, and a member of the class consisting of carbodi-tolylimide and its polymeric modifications.

5. A vulcanized compound derived from rubber or similar material, a vulcanizing agent, and a member of the group consisting of carbodi-tolylimide, homologues of carbodi-tolylimide, and their polymeric modification.

6. A vulcanized compound derived from rubber or similar material, a vulcanizing agent, and mixed forms of carbodi-tolylimide.

7. The process of vulcanizing rubber which consists in, incorporating into rubber mixed isomeric forms of carboditolylimide as an accelerator, then heating the resultant rubber mixture with a vulcanizing agent to effect vulcanization.

GEORGE H. STEVENS.